US012673868B2

(12) United States Patent (10) Patent No.: US 12,673,868 B2
Matsubara (45) Date of Patent: Jul. 7, 2026

(54) METHOD OF MANUFACTURING LITHIUM NITRIDE

(71) Applicant: FURUKAWA CO., LTD., Tokyo (JP)

(72) Inventor: Tetsuya Matsubara, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 907 days.

(21) Appl. No.: 17/765,974

(22) PCT Filed: Sep. 2, 2020

(86) PCT No.: PCT/JP2020/033281
§ 371 (c)(1),
(2) Date: Apr. 1, 2022

(87) PCT Pub. No.: WO2021/065309
PCT Pub. Date: Apr. 8, 2021

(65) Prior Publication Data
US 2022/0340424 A1 Oct. 27, 2022

(30) Foreign Application Priority Data

Oct. 2, 2019 (JP) ................................ 2019-182299

(51) Int. Cl.
*C01B 21/06* (2006.01)
(52) U.S. Cl.
CPC ................................... *C01B 21/061* (2013.01)
(58) Field of Classification Search
CPC ........ C01B 21/061; C01B 21/06; H01M 4/62; H01M 2300/0068; H01M 10/0525; H01M 10/0562; Y02E 60/10; C01P 2006/80
See application file for complete search history.

(56) References Cited

U.S. PATENT DOCUMENTS

| 2,866,685 | A | * | 12/1958 | Lam | ...................... | C01B 21/061 |
| | | | | | | 423/409 |
| 4,447,379 | A | * | 5/1984 | Wagner | ................... | C04B 35/58 |
| | | | | | | 264/618 |
| 10,160,036 | B2 | * | 12/2018 | Wietelmann | .......... | H01M 4/628 |

FOREIGN PATENT DOCUMENTS

| CN | 1850588 | A | * | 10/2006 |
| JP | 2001-48504 | A | | 2/2001 |
| JP | 2002-3209 | A | | 1/2002 |
| JP | 2014201511 | A | * | 10/2014 |
| JP | 2015-74566 | A | | 4/2015 |
| JP | 2015074566 | A | * | 4/2015 |

OTHER PUBLICATIONS

Machine translation of JP-2014201511-A (Year: 2014).*
Machine translation of CN-1850588-A (Year: 2006).*
Brogan (Heat Exchangers). (Year: 2025).*
Sigma-Aldrich (Lithium nitride) (Year: 2025).*
Machine translation of JP-2015074566-A (Year: 2015).*
Park et al. (Dendrite-Suppressed Lithium Plating from a Liquid Electrolyte via Wetting of Li3N, Advanced Energy Materials, 2017) (Year: 2017).*
International Search Report dated Nov. 2, 2020, issued in counterpart International Application No. PCT/JP2020/033281 (2 pages).
Office Action dated Aug. 31, 2023, issued in counterpart CN Application No. 202080068830.1. (6 pages).

* cited by examiner

*Primary Examiner* — Anthony J Zimmer
*Assistant Examiner* — Logan Edward Laclair
(74) *Attorney, Agent, or Firm* — WHDA, LLP

(57) ABSTRACT
Provided is a method of manufacturing lithium nitride including: a step (A) of preparing a lithium member in which inorganic particles are embedded; and a step (B) of nitriding the lithium member by bringing the lithium member into contact with nitrogen in a state where the inorganic particles are embedded.

14 Claims, No Drawings

METHOD OF MANUFACTURING LITHIUM NITRIDE

TECHNICAL FIELD

The present invention relates to a method of manufacturing lithium nitride.

BACKGROUND ART

Lithium nitride is known as a high ion conductor having a lithium ionic conductivity of $10^{-3}$ $SCm^{-1}$ at room temperature, and the application thereof to, for example, a solid electrolyte or an electrode material for a lithium ion battery is considered.

Lithium nitride is easily decomposed when coming into contact with water. Therefore, there are many restrictions on a synthesis method of lithium nitride, and typically lithium nitride is manufactured by reaction of metallic lithium and nitrogen gas.

Patent Document 1 (Japanese Unexamined Patent Publication No. 2001-48504) discloses a method of manufacturing lithium nitride in which metallic lithium and nitrogen are caused to react with each other while maintaining temperatures of lithium and lithium nitride to be formed at a melting temperature of lithium or lower by cooling in a nitrogen gas atmosphere.

In addition, Patent Document 2 (Japanese Unexamined Patent Publication No. 2002-3209) discloses a method of manufacturing lithium nitride including a step of heating metallic lithium to 50° C. to 110° C. in a nitrogen atmosphere at a temperature increase rate of 0.4° C./min to 7.0° C./min.

RELATED DOCUMENT

Patent Document

[Patent Document 1] Japanese Unexamined Patent Publication No. 2001-48504

[Patent Document 2] Japanese Unexamined Patent Publication No. 2002-3209

SUMMARY OF THE INVENTION

Technical Problem

However, according to an investigation by the present inventors, it was clarified that, with the method of manufacturing lithium nitride by reaction of metallic lithium and nitrogen gas as disclosed in Patent Documents 1 and 2, the reaction of metallic lithium and nitrogen gas does not occur with high reproducibility and there may be a case where a nitriding reaction does not progress.

The present invention has been made under these circumstances, and an object thereof is to provide a method of manufacturing lithium nitride in which the formation of lithium nitride progresses rapidly such that lithium nitride can be stably formed.

Solution to Problem

According to the present invention,
there is provided a method of manufacturing lithium nitride including: a step (A) of preparing a lithium member in which inorganic particles are embedded; and a step (B) of nitriding the lithium member by bringing the lithium member into contact with nitrogen in a state where the inorganic particles are embedded.

Advantageous Effects of Invention

According to the present invention, it is possible to provide a method of manufacturing lithium nitride in which the formation of lithium nitride progresses rapidly such that lithium nitride can be stably formed.

DESCRIPTION OF EMBODIMENTS

Hereinafter, an embodiment of the present invention will be described. Unless specified otherwise, a numerical range "A to B" represents A or more and B or less.

A method of manufacturing lithium nitride according to the present embodiment includes: a step (A) of preparing a lithium member in which inorganic particles are embedded; and a step (B) of nitriding the lithium member by bringing the lithium member into contact with nitrogen in a state where the inorganic particles are embedded.

With the method of manufacturing lithium nitride according to the present embodiment, the formation of lithium nitride progresses rapidly such that lithium nitride can be stably formed.

As described above, according to an investigation by the present inventors, it was clarified that, with the method of manufacturing lithium nitride by reaction of metallic lithium and nitrogen gas as disclosed in Patent Documents 1 and 2, the reaction of metallic lithium and nitrogen gas does not occur with high reproducibility and there may be a case where a nitriding reaction does not progress.

Therefore, as a result of a thorough investigation by the present inventors, it was found that the nitriding reaction of the lithium member progresses rapidly by bringing the lithium member into contact with nitrogen in a state where inorganic particles are embedded.

In general, on a surface of commercially available metallic lithium, a thin film including carbon and oxygen as components is present. In the processed metallic lithium such as foil, adhesion is suppressed by the film.

In the film including carbon and oxygen as components, typically, lithium carbonate is a main material and lithium oxide may be included. The film including carbon and oxygen as components on the metallic lithium surface has the effect of preventing the adhesion or the like of lithium foil as described above and the action of suppressing the progress of nitridation. It is presumed that, in metallic lithium manufactured in an atmosphere where an oxygen concentration or a dew point is appropriately managed, the nitriding reaction does not progress even after heating in a nitrogen gas atmosphere.

Therefore, as a result of a thorough investigation by the present inventors, it was found that the nitriding reaction of the lithium member progresses rapidly by introducing nitrogen in a state where inorganic particles are embedded.

The reason for this is presumed to be as follows. By embedding the inorganic particles in the lithium member, the lithium member is deformed such that fresh metallic lithium is exposed from the periphery of a contact portion between the lithium member and the inorganic particles. When nitrogen comes into contact with the fresh metallic lithium, the exposed fresh metallic lithium functions as a nitriding origin such that the nitriding reaction of the lithium member progresses rapidly.

Hereinafter, each of the steps will be described in detail.

(Step (A))

First, a lithium member in which inorganic particles are embedded is prepared.

The lithium member according to the present embodiment is metallic lithium having a surface on which a thin film including carbon and oxygen as components is present, and the shape thereof does not need to be special as long as it is a generally provided shape such as an ingot, foil, a wire, or a rod. In this case, in order to rapidly complete the nitriding reaction, a shape having a large surface area is preferable. Therefore, foil is preferable as the shape of the lithium member. That is, it is preferable that the lithium member according to the present embodiment is metallic lithium foil.

The thickness of the metallic lithium foil is preferably 3 mm or less and more preferably 1 mm or less. When the thickness of the metallic lithium foil is the upper limit value or less, an explosive reaction caused by accumulation of reaction heat can be suppressed. The thickness of the metallic lithium foil is not particularly limited and may be, for example, 0.05 mm or more and 0.1 mm or more.

The inorganic particles according to the present embodiment are not particularly limited. For example, lithium nitride powder, lithium sulfide powder, phosphorus sulfide powder, or solid electrolyte powder can be used. From the viewpoint of obtaining lithium nitride having a high purity or the viewpoint of simplifying a step of removing the inorganic particles, lithium nitride powder is preferable as the inorganic particles.

In addition, as the inorganic particles, inorganic particles including one kind or two or more kinds of elements selected from the group consisting of lithium, phosphorus, sulfur, and nitrogen can be used, and inorganic particles of one kind or two or more kinds selected from the group consisting of lithium nitride powder, phosphorus sulfide powder, and red phosphorus powder are more preferable. From the viewpoint of obtaining lithium nitride having a high purity or the viewpoint of simplifying a step of removing the inorganic particles, lithium nitride powder is still more preferable as the inorganic particles.

The inorganic particles according to the present embodiment are not particularly limited, and an average particle size $d_{50}$ in a weight average particle size distribution measured using a laser diffraction scattering particle size distribution method is preferably 0.1 μm or more and 45 μm or less, and more preferably 0.5 μm or more and 20 μm or less.

By setting the average particle size $d_{50}$ of the inorganic particles to be the lower limit value or more, the handling properties of the inorganic particles can be improved. In addition, by setting the average particle size $d_{50}$ of the inorganic particles to be the upper limit value or less, the amount of a nitriding origin region described below formed can be increased, and thus the nitriding reaction of the lithium member can be made to progress more rapidly.

In the lithium member in which the inorganic particles are embedded, when a total amount of the inorganic particles and the lithium member is represented by 100 mass %, the amount of the inorganic particles embedded is preferably 0.1 mass % or more and more preferably 0.5 mass % or more and is preferably 10 mass % or less and more preferably 5 mass % or less.

When the amount of the inorganic particles embedded is the lower limit value or more, the amount of a nitriding origin region described below formed can be increased, and thus the nitriding reaction of the lithium member can be made to progress more rapidly.

In addition, when the amount of the inorganic particles embedded is the upper limit value or less, an explosive reaction caused by accumulation of reaction heat can be suppressed, and thus the nitriding reaction of the lithium member can be made to progress more safely.

Examples of a method of embedding the inorganic particles in a partial region of the lithium member include a method including: sprinkle the inorganic particles on the surface of the lithium member; and pressing the lithium member to which the inorganic particles are attached.

The lithium member can be pressed using, for example, a hand roller, a roll press machine, and a flat press machine. Among these, a roll press machine is preferable. The roll press machine can perform pressing continuously at a constant pressing pressure by setting a roll interval and is suitable for mass production, which is preferable.

(Step (B))

In the method of manufacturing lithium nitride according to the present embodiment, in the step (B), the nitriding reaction of the lithium member progresses by bringing the lithium member into contact with nitrogen in a state where the inorganic particles are embedded. For example, the lithium member is brought into contact with nitrogen by disposing the lithium member in which the inorganic particles are embedded in a nitrogen atmosphere.

At an initial stage of the nitriding reaction, the nitriding reaction occurs in the periphery of the region where the inorganic particles are embedded, and this region is blackened. In the present embodiment, this blackened region will be referred to as "nitriding origin region".

At an initial stage of the nitriding reaction, a plurality of the nitriding origin regions are formed, a nitrided region extends over time from the nitriding origin region as a base point to a periphery of the nitriding origin region, and the formation of lithium nitride progresses. Finally, the entirety of the lithium member is nitrided.

Nitrogen gas is used for the nitriding reaction of the lithium member. The nitrogen gas is easily reactive with lithium and is inexpensive and toxic-free.

It is preferable that the oxygen concentration in the nitrogen gas is as low as possible. The reason for this is that, when the oxygen concentration in the nitrogen gas is high, metallic lithium is significantly oxidized and corroded, the formation of lithium nitride is inhibited, and lithium oxide or lithium hydroxide is incorporated into lithium nitride.

Specifically, the oxygen concentration in the nitrogen gas is preferably 100 ppm or less and more preferably 60 ppm or less.

In addition, the purity of the nitrogen gas is preferably 99.99% or higher.

In the method of manufacturing lithium nitride according to the present embodiment, it is preferable that the lithium member is nitrided in a nitrogen atmosphere where a dew point is lower than −15° C., and it is more preferable that the lithium member is nitrided by heating the lithium member in a nitrogen atmosphere where a dew point is lower than −15° C.

The dew point is more preferably −18° C. or lower, still more preferably −20° C. or lower, still more preferably −25° C. or lower, still more preferably −30° C. or lower, still more preferably −40° C. or lower, and still more preferably −50° C. or lower. The lower limit value of the dew point is not particularly limited and is, for example, −90° C. or higher.

By setting the dew point of the nitrogen atmosphere to be lower than the upper limit value, the formation of a film including lithium oxide or lithium hydroxide on the metallic lithium surface can be suppressed. Therefore, the contact area between metallic lithium and nitrogen increases such that the nitriding reaction of the lithium member can be made to progress more rapidly.

In the step (B), it is preferable that the lithium member is heated using a local heating unit capable of locally heating the lithium member. That is, it is preferable that the lithium member disposed in the nitrogen atmosphere or the lithium member and the periphery thereof are locally heated instead of heating the entirety of the nitrogen atmosphere. As a result, an increase in the internal temperature of the nitrogen atmosphere is suppressed. Therefore, an increase in the dew point of the nitrogen atmosphere caused when a water adsorbent such as a molecular sieve in the nitrogen atmosphere or water attached to a device, an instrument, or the like is evaporated can be suppressed. That is, by heating the lithium member using the local heating unit capable of locally heating the lithium member, the lithium member can be heated while maintaining the dew point of the nitrogen atmosphere to be lower than the upper limit value.

Examples of the local heating unit include conductive heat transfer heating and radiant heat transfer heating. These heating units may be used alone or in combination of two or more types.

The conductive heat transfer heating is a method of bringing the lithium member into contact with a high temperature body to heat the lithium member by heat transfer, and examples of a device for performing conductive heat transfer heating include a hot plate type heater, and a heating roll.

The radiant heat transfer heating is a method of heating the lithium member by making the lithium member to absorb energy radiating from a high temperature body as electromagnetic waves, and examples of a device for performing radiant heat transfer heating include an infrared heater and an infrared lamp.

In the method of manufacturing lithium nitride according to the present embodiment, from the viewpoint of accelerating the formation of the lithium nitride more rapidly, the heating temperature of the heating unit in the step (B) is preferably 30° C. or higher, more preferably 40° C. or higher, and still more preferably 45° C. or higher. The upper limit of the heating temperature of the heating unit is not particularly limited and, from the viewpoint of suppressing an explosive reaction caused by accumulation of reaction heat, is preferably 120° C. or lower, more preferably 100° C. or lower, still more preferably 80° C. or lower, and still more preferably 60° C. or lower.

Here, the heating temperature of the heating unit refers to a preset temperature of the heating unit, that is, a temperature of the heating portion.

In the method of manufacturing lithium nitride according to the present embodiment, from the viewpoint of accelerating the formation of the lithium nitride more rapidly, the real temperature of the lithium member in the step (B) is preferably 30° C. or higher, more preferably 40° C. or higher, and still more preferably 50° C. or higher. The upper limit of the real temperature of the lithium member in the step (B) is not particularly limited and, from the viewpoint of suppressing an explosive reaction caused by accumulation of reaction heat, is preferably 120° C. or lower, more preferably 100° C. or lower, and still more preferably 80° C. or lower.

Here, the real temperature of the lithium member in the step (B) refers to the temperature of the surface of the lithium member.

In the method of manufacturing lithium nitride according to the present embodiment, from the viewpoint of accelerating the formation of the lithium nitride more rapidly, the atmosphere temperature of the nitrogen atmosphere in the step (B) is preferably 20° C. or higher, more preferably 23° C. or higher, still more preferably 25° C. or higher, and still more preferably 28° C. or higher. The upper limit of the atmosphere temperature of the nitrogen atmosphere in the step (B) is not particularly limited and, from the viewpoint of maintaining the dew point of the nitrogen atmosphere in the step (B) to be lower than the upper limit value, is preferably 40° C. or lower, more preferably 35° C. or lower, and still more preferably 30° C. or lower.

Here, the atmosphere temperature of the nitrogen atmosphere in the step (B) refers to a temperature of a space at a distance of 30 cm from the heating portion of the heating unit.

In the method of manufacturing lithium nitride according to the present embodiment, from the viewpoint of maintaining the dew point of the nitrogen atmosphere in the step (B) to be lower than the upper limit value, the atmosphere temperature of the nitrogen atmosphere may be controlled using a heat exchanger. As a result, even when the temperature at which the lithium member disposed in the nitrogen atmosphere is heated increases, an increase in the atmosphere temperature of the nitrogen atmosphere in the step (B) can be suppressed, and thus the dew point of the nitrogen atmosphere in the step (B) can be effectively maintained to be lower than the upper limit value.

The time for which the nitriding reaction of the lithium member progresses is, for example, 0.5 hours or longer and 24 hours or shorter, preferably 0.5 hours or longer and 8 hours or shorter, and more preferably 1 hour or longer and 5 hours or shorter.

(Step (C))

Optionally, the nitrided lithium member is crushed into powder after the step (B). As a result, the powdery lithium nitride can be obtained. A method of crushing the nitrided lithium member into powder is not particularly limited, and the lithium member can be crushed using a generally well-known crushing unit.

The lithium nitride obtained using the manufacturing method according to the present embodiment can be suitably used for, for example, a solid electrolyte for a lithium ion battery, an electrode material for a lithium ion battery, or an intermediate raw material for a chemical agent. The lithium nitride obtained using the manufacturing method according to the present embodiment has a high purity, and thus can be suitably used as a raw material of a solid electrolyte for a lithium ion battery or an electrode material for a lithium ion battery for which particularly high purity is required.

Hereinabove, the embodiment of the present invention has been described. However, the embodiment is merely an example of the present invention, and various configurations other than the above-described configurations can also be adopted.

EXAMPLES

Hereinafter, the present invention will be described in more detail using Examples and Comparative Examples. However, the present invention is not limited to these Examples and Comparative Examples.

Example 1

80 mg of lithium nitride powder was sprinkled on both surfaces of metallic lithium foil (manufactured by Honjo Metal Co., Ltd., 60 mm×250 mm×1 mm, 8 g) having a purity of 99.7%. Next, using a hand roller, the lithium nitride powder attached to the metallic lithium foil was embedded in the surface layer of the metallic lithium foil.

Next, a hot plate heated to 50° C. was set in vacuum replacement-type stainless glove box in a nitrogen atmosphere (dew point: −30° C., temperature: 25° C.), the metallic lithium foil having the surface layer in which the lithium nitride powder was embedded was disposed on the heated hot plate, and the nitriding reaction of the metallic lithium foil started. Here, the internal temperature of the glove box was controlled to an ambient temperature (25° C.) using a heat exchanger connected to an air cooling type solvent circulation device. In addition, by circulating the nitrogen gas in the glove box through a column of a water adsorbent ((manufactured by Wako Pure Chemical Industries, Ltd., molecular sieves 3A), water in the nitrogen gas was removed, and the dew point in the glove box was maintained at −30° C. In addition, the internal pressure of the nitrogen gas in the glove box was automatically controlled by a pressure switch, and when the nitrogen gas was consumed by a nitriding reaction with the metallic lithium foil such that the internal pressure decreased, nitrogen gas corresponding to the amount of nitrogen gas consumed was set to be introduced into the glove box.

Next, a nitriding ratio was calculated from a change in the weight of the metallic lithium foil. As a result, a nitriding ratio 1 hour after the disposing the metallic lithium foil on the hot plate was 81%, and a nitriding ratio 2 hours after the disposing the metallic lithium foil on the hot plate was 100%.

Here, the nitriding ratio of 100% represents that all of the metallic lithium foil (Li) was transformed into lithium nitride ($Li_3N$).

Example 2

The nitriding reaction of the metallic lithium foil was performed using the same method as that of Example 1, except that the metallic lithium foil was not heated (that is, the hot plate was not used). A nitriding ratio 5 hours after the disposing the metallic lithium foil in the glove box was 100%.

Example 3

The nitriding reaction of the metallic lithium foil was performed using the same method as that of Example 1, except that a sulfide-based solid electrolyte material ($Li_{10}P_3S_{12}$) was used instead of the lithium nitride powder. A nitriding ratio 3 hour after the disposing the metallic lithium foil on the hot plate was 77%, and a nitriding ratio 48 hours after the disposing the metallic lithium foil on the hot plate was 100%.

Example 4

In a glove box of an argon atmosphere (dew point: −76° C., temperature: 25° C.), 4 mg of lithium nitride powder was sprinkled on both surfaces of metallic lithium foil (manufactured by Honjo Metal Co., Ltd., φ=14 mm, t=0.1 mm, 9 mg) having a purity of 99.7%. Next, using a hydraulic hand press machine, the lithium nitride powder attached to the metallic lithium foil was pressed at about 20 MPa for 10 seconds and embedded in the surface layer of the metallic lithium foil.

Next, the metallic lithium foil was set in vacuum replacement-type stainless glove box in a nitrogen atmosphere (dew point: −30° C., temperature: 25° C.), and the nitriding reaction of the metallic lithium foil started. Here, the internal temperature of the glove box was controlled to an ambient temperature (25° C.) using a heat exchanger connected to an air cooling type solvent circulation device. In addition, by circulating the nitrogen gas in the glove box through a column of a water adsorbent ((manufactured by Wako Pure Chemical Industries, Ltd., molecular sieves 3A), water in the nitrogen gas was removed, and the dew point in the glove box was maintained at −30° C. In addition, the internal pressure of the nitrogen gas in the glove box was automatically controlled by a pressure switch, and when the nitrogen gas was consumed by a nitriding reaction with the metallic lithium foil such that the internal pressure decreased, nitrogen gas corresponding to the amount of nitrogen gas consumed was set to be introduced into the glove box.

Next, a nitriding ratio was calculated from a change in the weight of the metallic lithium foil. As a result, a nitriding ratio 24 hours after the disposing the metallic lithium foil in the glove box of the nitrogen atmosphere was 97%.

Example 5

The nitriding reaction of the metallic lithium foil was performed using the same method as that of Example 1, except that 4 mg of red phosphorus (manufactured by Kojundo Chemical Laboratory Co., Ltd., purity: 99%) was used instead of the lithium nitride powder. A nitriding ratio 24 hours after the disposing the metallic lithium foil in the glove box of the nitrogen atmosphere was 78%.

Example 6

The nitriding reaction of the metallic lithium foil was performed using the same method as that of Example 1, except that 4 mg of $P_2S_5$(manufactured by Perimeter Solutions, product name: Normal/S) was used instead of the lithium nitride powder. A nitriding ratio 24 hours after the disposing the metallic lithium foil in the glove box of the nitrogen atmosphere was 68%.

Comparative Example 1

The nitriding reaction of the metallic lithium foil was performed using the same method as that of Example 2, except that the lithium nitride powder was not used. A nitriding ratio 96 hours after the disposing the metallic lithium foil in the glove box was 0%.

Comparative Example 2

The nitriding reaction of the metallic lithium foil was performed using the same method as that of Example 2, except that the embedding of the lithium nitride powder in the metallic lithium foil by the hand roller was not performed (that is, the lithium nitride powder was attached to the surface of the metallic lithium foil). A nitriding ratio 96 hours after the disposing the metallic lithium foil in the glove box was 0%.

Comparative Example 3

The nitriding reaction of the metallic lithium foil was performed using the same method as that of Example 4, except that the lithium nitride powder was not used. A nitriding ratio 24 hours after the disposing the metallic lithium foil in the glove box of the nitrogen atmosphere was 0%.

The present application claims priority based on Japanese Patent Application No. 2019-182299 filed on Oct. 2, 2019, the entire content of which is incorporated herein by reference.

The invention claimed is:

1. A method of manufacturing lithium nitride, the method comprising:

providing a metallic lithium in a shape of a foil;

providing inorganic particles of lithium nitride powder;

a step (A) of applying the inorganic particles on a surface of the metallic lithium, followed by pressing the surface to prepare a lithium member in which the inorganic particles are embedded such that the inorganic particles are exposed on the surface of the metallic lithium; and a step (B) of nitriding the lithium member by bringing the lithium member into contact with nitrogen, so as to make lithium nitride from the metallic lithium.

2. The method of manufacturing lithium nitride according to claim 1, wherein in the step (B), a nitriding origin region is formed by nitriding a periphery of a region where the inorganic particles are embedded, a nitrided region extends from the nitriding origin region as a base point to a periphery of the nitriding origin region, and finally entirety of the lithium member is nitrided.

3. The method of manufacturing lithium nitride according to claim 1, wherein the inorganic particles are inorganic particles including one kind or two or more kinds of elements selected from the group consisting of lithium, phosphorus, sulfur, and nitrogen.

4. The method of manufacturing lithium nitride according to claim 1, wherein when a total amount of the inorganic particles and the lithium member is represented by 100 mass %, an amount of the inorganic particles embedded is 0.1 mass % or more and 10 mass % or less.

5. The method of manufacturing lithium nitride according to claim 1, wherein in the step (B), the lithium member is nitrided in a nitrogen atmosphere where a dew point is lower than −15° C.

6. The method of manufacturing lithium nitride according to claim 1, wherein in the step (B), the lithium member is heated using a local heating unit capable of locally heating the lithium member.

7. The method of manufacturing lithium nitride according to claim 6, wherein the local heating unit includes at least one heating unit selected from conductive heat transfer heating and radiant heat transfer heating.

8. The method of manufacturing lithium nitride according to claim 6, wherein a heating temperature of the heating unit in the step (B) is 30° C. or higher.

9. The method of manufacturing lithium nitride according to claim 1, wherein an atmosphere temperature in the step (B) is 20° C. or higher and 40° C. or lower.

10. The method of manufacturing lithium nitride according to claim 1, wherein an atmosphere temperature in the step (B) is controlled using a heat exchanger.

11. The method of manufacturing lithium nitride according to claim 1, wherein a real temperature of the lithium member in the step (B) is 30° C. or higher.

12. The method of manufacturing lithium nitride according to claim 1, wherein a thickness of the metallic lithium foil is 3 mm or less.

13. The method of manufacturing lithium nitride according to claim 1, the method further comprising:

a step (C) of crushing the nitrided lithium member into powder after the step (B).

14. The method of manufacturing lithium nitride according to claim 1, wherein the metallic lithium in the shape of the foil is entirely nitrided.

* * * * *